United States Patent [19]

Gannon

[11] 4,017,323
[45] Apr. 12, 1977

[54] PITCH-ALUMINUM PIGMENT COMPOSITION

[75] Inventor: Charles R. Gannon, Ashland, Ky.

[73] Assignee: Ashland Oil, Inc., Ashland, Ky.

[22] Filed: Sept. 23, 1974

[21] Appl. No.: 508,388

Related U.S. Application Data

[60] Continuation of Ser. No. 373,628, June 26, 1973, which is a division of Ser. No. 277,290, Aug. 2, 1972, which is a continuation-in-part of Ser. No. 224,216, Feb. 7, 1972, abandoned.

[52] U.S. Cl. .......................... 106/281 R; 106/284; 427/238
[51] Int. Cl.² .......................................... C08L 95/00
[58] Field of Search .......... 106/278, 281 R, 193 M, 106/284

[56] References Cited

UNITED STATES PATENTS

| | | | |
|---|---|---|---|
| 1,355,102 | 10/1920 | Yeager | 106/278 |
| 1,568,215 | 1/1926 | Fleming | 106/278 |
| 2,201,981 | 5/1940 | Baron | 106/278 |
| 2,255,825 | 9/1941 | Skeen | 106/284 |
| 2,307,027 | 1/1943 | Davie et al. | 106/278 |
| 2,332,219 | 10/1943 | Harshberger | 106/281 R |
| 2,461,352 | 2/1949 | Smith et al. | 601/269 |

*Primary Examiner*—Lorenzo B. Hayes

[57] ABSTRACT

Disclosed is a pitch-impregnated fiber pipe having a surface coating of pitch containing aluminum pigment. The method of manufacture comprises suspending unimpregnated, conventionally manufactured porous fiber pipe tubes in a suspension of aluminum powder in the liquid pitch and forcing the pitch into the pores and interstices of the fiber pipe tubes.

4 Claims, No Drawings

PITCH-ALUMINUM PIGMENT COMPOSITION

CROSS REFERENCES TO RELATED APPLICATIONS

This is a continuation of application Ser. No. 373,628, filed June 26, 1973, which is a division of application Ser. No. 277,290 filed Aug. 2, 1972, which is a Continuation-in-part of U.S. application Ser. No. 244,216, filed Feb. 7, 1972, now abandoned but co-pending at the date of filing the Ser. No. 277,290 application.

FIELD OF INVENTION

This invention relates to: porous articles improved for certain purposes by being at least partially saturated with impregnants; to a process for making such impregnated articles; and to impregnant compositions. The invention is concerned in one specific embodiment with pitch-impregnated fiber pipe, a method for manufacturing the same, and pitch-impregnant compositions.

PRIOR ART

Porous articles are improved for certain purposes by saturating them with an impregnant material, such as pitch. The desired improved properties obtained include increases in density, strength, durability, electrical resistance, insulating value, and resistance to water as well as decreased permeability and improved finish.

Impregnants (impregnating materials), satisfactory for industrial use, have been formulated with pitches derived from water gas tar, oil gas tar, petroleum tars and sludges, and wood tar. The primary sources of pitch impregnants are coal tar pitch derived from the pyrolysis of coal and pitch derived from petroleum. These have been used by themselves, in blends, or in combination with resins, oils, waxes, and other modifying additives. Such impregnants are widely used in the manufacture of roofings, water-proofing compounds, insulating papers and fabrics, building boards, electrical insulators and conduits, felts and belts, brake linings, ceramic bodies and bricks. Coal tar pitch and pitch derived from petroleum have found a particularly important use in the manufacture of bituminized fiber pipe for use in sewer and drainage lines and as conduit for power and telephone cables.

The manufacture of bituminous-impregnated fiber pipe is well known in the prior art. Ordinarily a pulp slurry of a fibrous material first is made. Newsprint is a common material for the pulp slurry, although other materials such as chemical pulp and asbestos fibers may also be added. A wet web of interfelted cellulose fiber is deposited from the slurry onto a felt roll. Subsequently the web is wound onto a mandrel to form a tube of a desired wall thickness. Each wet tube on a supporting mandrel is then passed through a drying oven, and the mandrel subsequently is removed. The result is a dry paper tube of a desired wall thickness. There are a number of methods of impregnating the dry paper tubes with a water-proofing impregnant, which ordinarily is molten pitch. These methods include simple soaking of the paper tubes in the impregnant, pressure saturation, vacuum saturation or a combination of pressure and vacuum saturation.

In the combination method a number of the dry paper tubes are first placed in a pressure vessel and subjected to a vacuum for several minutes. The vessel, still at reduced pressure, is then filled with molten pitch until the paper tubes are submerged. The molten pitch is circulated for a period of time and the pressure in the vessel is then restored to atmospheric pressure thereby causing the molten pitch to permeate the pore spaces and interstices of the paper tubes. The remaining molten pitch is drained from the pressure vessel and the impregnated tubes are removed and quenched.

The pitch-impregnated tubes thus made are then ready for trimming of the ends, machining and packaging for shipment. The pitch-impregnated fiber pipe thus manufactured is well suited for use as sewer pipe, underground conduit pipe for utility lines such as telephone cables and electric power lines, and other uses where conditions of low pressures and high moisture may be encountered. The pitch present in the pipe binds the cellulose fibers and imparts strength to the pipe as well as rendering it highly resistant to moisture. The fiber pipe is, however, not completely immune to the penetration of moisture. Under prolonged exposure to moisture, the pipe may eventually lose much of its original strength. A pitch-impregnated fiber pipe having increased moisture resistance thus is obviously desirable.

Pitch-impregnated fiber pipe is often stock-piled in open storage areas where it is exposed to temperature extremes, as well as to sunlight, rain, and snow. Consequently, over a period of time, the initially glossy black surface of the pipe deteriorates to a dull matte surface. Deterioration is thought to result primarily from exposure to the ultraviolet fraction of sunlight. A fiber pipe possessing improved resistance to exposure thus is highly desirable.

In the manufacture of fiber pipe coal tar pitch, as distinguished from petroleum pitch, has been preferred in the past. Coal tar pitch enables the manufacture of a fiber pipe having suitable moisture resistance and resistance to weathering. This is primarily caused by the carbon particles (quinoline insolubles) in coal tar pitch which filter to the inside surfaces of the pipe during the impregnation process, thus forming a protective coating which renders the pipe moisture resistant and enhances its weather-resistant characteristics. Petroleum pitch has been available more recently and has found use as an impregnant either in blends with coal tar pitch or by itself.

Fiber pipe produced with a 100% petroleum pitch impregnant, which contains very little suspended carbon particles, has, however, been found to be less resistant to moisture and to weathering than fiber pipe completely impregnated with coal tar pitch or blends of petroleum pitch and coal tar pitch. Petroleum pitch thus has not been completely accepted as a sole impregnant for fiber pipe.

Although fiber pipe produced with coal tar pitch, or blends of coal tar pitch and petroleum pitch, exhibits excellent characteristics of quality, persons exposed to the vapors during the impregnating process or to the coal tar pitch itself in the subsequent handling of the pipe, often experience skin irritation caused by the components of the coal tar pitch. In contrast, persons working with petroleum pitch by itself have not experienced this problem, thus making the use of petroleum pitch more desirable, particularly where ecological concern is of the utmost importance.

Another desirable property of pitch-impregnated fiber pipe would be a surface color other than the black color imparted by the pitch. Creating a colored effect with sprayed coatings has been attempted in the past, but with little success. The solubility of pitch in the paint vehicle has always created unattractive blotching on the pipe surface.

Finally, a less publicized, but desirable surface property of pitch-impregnated pipe, particularly on the interior surface, is reduced coefficient of friction. Reduced friction requires less effort to pull bundles of cable through the pipe conduit.

An object of this invention; therefore, is to make a porous article which is at least partially impregnated with an impregnant and has a surface film of impregnant containing at least partially dispersed aluminum pigment therein. Another object of this invention is to provide a method of making such an article. Another object of this invention is to make a pitch-impregnated fiber pipe having improved resistance to attack by moisture and to weathering. Another object of this invention is to enable the increased use of petroleum pitch either alone or in combination with other pitches as an impregnant for fiber pipe. Another object of this invention is to provide a method of making a pitch-impregnated fiber pipe having a uniform metallic surface. Still another object of this invention is to make available a pitch-impregnated fiber pipe having uniform metallic interior and exterior surfaces which offer reduced friction resistance.

SUMMARY OF THE INVENTION

In essence, this invention comprises: the process of impregnating porous articles with an impregnant containing suspended aluminum particles; the article so impregnated having a surface-coating of impregnant containing suspended aluminum; and the impregnant material itself. In one specific embodiment of the invention, bituminous impregnated fiber pipe is prepared by impregnating porous tubular forms with pitch containing suspended particulated aluminum therein. In a still more specific embodiment, the fiber pipe is impregnated with an unoxidized petroleum pitch containing a suspended leafing aluminum pigment.

DETAILED DESCRIPTION OF THE INVENTION

Generally speaking the article to be impregnated, such as a building board, brick, ceramic body, roofing felt, or fiber tube, must be sufficiently permeable to enable penetration of the impregnant when the latter is applied to the surface. The article further must be stable at the temperature of impregnation.

The impregnant (the impregnating material) should have a low viscosity at the impregnating temperature to enable sufficient penetration into the article being treated. The impregnant material must, however, be reasonably hard at ambient service temperatures. In addition, it is desirable that the impregnant be low in filterable suspended matter (carbonaceous solids, dirt and mineral ash) particularly since aluminum particles are to be added. If too much filterable suspended material is included, unsightly surface deposits on the finished article can result or impregnation can be incomplete. The quantity of suspended matter that can be tolerated in the impregnant material will depend upon the article to be treated (its nature, porosity, and wall thickness), the particle size of the suspended material, viscosity of the impregnant fluid, and the method of impregnation. Test methods of determining filterables present in impregnant materials are known in the prior art. Other properties desirable in the impregnating material, particularly if high temperatures and vacuums are used, are limits on the content of low boiling volatile materials, flash and fire point, and toxicity. A number of bituminous materials meeting these requirements are available including coal tar and petroleum pitches.

Any commercially available aluminum pigment can be used in this invention. The system of grading and classification of aluminum powders and paste varies according to the individual manufacturer. One of the most commonly accepted classifications of aluminum pastes and powders is that of The American Society for Testing Materials. This ASTM classification is as follows:

Table I

ASTM Designation 962-66
Maximum Amount Retained on a No. 325 (44 u) Sieve

| Type | A. Fine | Class B. Medium | C. Coarse |
|---|---|---|---|
| 1. Leafing aluminum pigment powder | 0.1% | 1.5% | 20% |
| 2. Leafing aluminum pigment paste | 0.1% | 1.0% | 15% |
| 3. Non-leafing aluminum pigment powder | 1.5% | 6.0% | 20% |
| 4. Non-leafing aluminum pigment paste | 0.1% | 1.0% | 11.0% |

The amount of aluminum pigment (powder or paste) added to the impregnant is determined by a number of factors. Aluminum pigments are expensive. Accordingly, the amount added should only be that necessary to provide a proper coating on the article being treated. The minimum amount will be that necessary to achieve a desired improvement in the properties of the acticle.

As to the manner of impregnating an article with impregnant containing suspended aluminum, any of the methods presently used in the art can be employed. These include simple soaking in an open tank over a period of time, pressure saturation, vacuum saturation, and combined pressure and vacuum saturation. This last method is a preferred method and is more fully discussed in a following portion of the description.

As noted previously, a more specific embodiment of this invention is the manufacture of bituminous impregnated fiber pipe in which fibrous tubes are impregnated with a pitch impregnant containing suspended aluminum pigment therein. In this particular embodiment the fibrous tubes to be impregnated are of the kind presently used in conventional fiber pipe manufacturing. As discussed previously, they are made by winding a wet web of cellulose pulp on a mandrel to the desired wall thickness and then drying the tube either before or after it had been removed from the mandrel. The technique of forming these dried paper tubes is well known in the art and is discussed briefly in U.S. Pat. Nos. 1,803,409; 1,854,230; and 1,860,674.

The pitches commercially available for manufacturing bituminous fiber pipe include coal tar pitch and petroleum pitch. Petroleum pitch, at least for the purposes of describing this invention, may be either oxidized petroleum pitch or unoxidized petroleum pitch. Oxidized petroleum pitch is familiar to those skilled in the art, and is derived by air blowing certain petroleum refinery flow streams to obtain a desired pitch product.

Unoxidized petroleum pitch can be further characterized as unmodified thermal petroleum pitch. These pitches remain rigid at temperatures closely approaching their melting points. The preferred procedure for preparing the unoxidized petroleum pitch uses as starting material, a clarified slurry oil or cycle oil from which substantially all paraffins have been removed in fluid catalytic cracking. Where the fluid catalytic cracking is not sufficiently severe to remove substantially all paraffins from the slurry oil or cycle oil, they may be extracted with furfural. In either case, the resultant starting material is a highly aromatic oil boiling at about 700° to 850° F. This oil is thermally cracked at elevated temperatures and pressures for a time sufficient to produce a thermally cracked petroleum pitch with a softening point of about 150° F to about 210° F. The manufacture of unoxidized petroleum pitches is described in U.S. Pat. Nos. 2,768,119 and 3,140,248. Table II presents comparative properties of four unoxidized petroleum pitches (A, B, C and D) and an oxidized pitch (E).

TABLE II

| Test | Test Method | Pitch A | Pitch B | Pitch C | Pitch D | Pitch E |
| --- | --- | --- | --- | --- | --- | --- |
| Softening Point, ° F., R & B | ASTM D-2398 | 173 | 174 | 168.5 | 166 | 174 |
| Density, G/cc | Mettler | 1.192 | 1.205 | 1.160 | 1.178 | 1.186 |
| Mod. Con. Carbon Wt.% | ASTM D-2416 | 37.8 | 43.8 | 39.6 | 36.9 | 37.1 |
| Flash, COC, ° F. | ASTM D-92 | 540 | 495 | 545 | 535 | 480 |
| Pen. 100/5/77 | ASTM D-5 | 0 | 0 | 0 | 0 | 0 |
| Pen. 200/60/115 | ASTM D-5 | 128 | 47 | 208 | — | 123 |
| Pen. 50/60/15 | ASTM D-5 | 40 | 37 | 68 | — | 48 |
| Sulfur, Wt.% | ASTM D-1552 | 2.73 | 1.47 | 2.01 | 0.95 | 1.69 |
| Benzene Ins., Wt.% | ASTM D-2317 | 0.80 | 11.7 | 1.9 | 2.3 | 8.1 |
| Quinoline Insol., Wt.% | ASTM D-2318 | 0.11 | (1) | Nil | Nil | Nil |
| Viscosity, CPS 350 | Brookfield | 40 | 70 | 45 | 32 | 70 |
| (No. 2 Spindle, 325 | Brookfield | 60 | 110 | 82.5 | 65 | 125 |
| 30 RPM) 300 | Brookfield | 140 | 230 | 165 | 135 | 240 |

(1) Quantity of solids content too great to permit filtering

At the time of filing the parent application, Ser. No. 224,216, it was thought that a leafing aluminum in combination with an unoxidized petroleum pitch was necessary to obtain the desired improvement in resistance to water and in weathering. This limitation appears necessary only if it is desired to produce a fiber pipe product having smooth, metallic-colored or aluminized exterior and interior surfaces. Thus, any aluminum pigment, particularly any of those described in Table I, can be used in combination with coal tar pitch, unoxidized (thermal) petroleum pitch, oxidized petroleum pitch or mixtures of these.

The amount of aluminum powder or paste pigment added to the pitch impregnant will, of course, vary. The minimum amount will be that required to achieve a desired level of resistance in the finished product to moisture or weathering. The maximum amount will be determined by the economics of the process and the possibility of uneven penetration of pitch if too much filterable aluminum pigment is suspended in the pitch impregnant. Ranges of 0.1 to 1.4% or preferably 0.3 to 0.7% of aluminum pigment in a mixture of pitch and aluminum can be used. These values for the aluminum concentration are based on aluminum alone and do not include any additional solvents or stabilizing materials which may be present. The ranges given are not restrictive. Less or greater concentrations of aluminum can be added.

If pitch-impregnated pipe is to be manufactured having, in addition to improved moisture and weathering resistance, metallic or aluminized exterior and interior surfaces, the best results are obtained if a leafing-type aluminum pigment is used in combination with an unoxidized (thermal) petroleum pitch. The term "leafing" is well known to those in the art and is defined in Federal Test Method Standard No. 141. Leafing refers to the fact that certain metallic pigments occur in the form of thin flakes. When such pigments are mixed with a vehicle and applied as a paint film, the thin flakes float and concentrate at the surface of the paint film where they overlap each other. Aluminum powder is treated with a leafing agent such as stearic acid to render it leafing, as well as to reduce the hazard of explosion. Leafing aluminum pigment can be prepared by grinding aluminum in a ball mill in the presence of mineral spirits or similar solvents. The mixture is then filtered to yield an aluminum paste. A typical leafing aluminum pigment available commercially in paste form has the compositions shown in Table III.

TABLE III

| | |
| --- | --- |
| Non-volatile content | 68.0% minimum |
| Screen retention 325 mesh | 14.0% maximum |
| Moisture content | 0.1% maximum |
| Solvent present | Mineral Spirits |
| Bulking Value | 0.080 gal. per lb. |
| Weight per Solid Gallon | 12.45 lbs. |
| Particle Size Distribution | |
| 44–0.5 microns | 85% |
| 44–150 microns | 7% |

It has been determined that some non-leafing aluminum powders, when combined with an unoxidized petroleum pitch, will also yield a metallic-colored or aluminized pipe. It is believed that in these cases the stabilizing agent added to the aluminum pigment to render it non-leafing is in fact decomposed when the aluminum pigment is heated to the temperature of the molten petroleum pitch, and that subsequently the aluminum pigment acts as a leafing aluminum. Thus, although leafing aluminum powders are preferred in the specific application of the invention to manufacture the metallic-colored or aluminized pipe, non-leafing aluminum powders, which will function as leafing pigments at the temperature of impregnation, can also be used.

Returning now to the broader concept of making a pitch-impregnated fiber pipe using any of the commercial aluminum pigments available as well as any of the common pitches available, these two materials can be combined in several ways to make the impregnating material. If the aluminum pigment has been supplied in paste form with a liquid carrier, the paste can be manually added to the mass of molten pitch and the mixture agitated by stirring or circulation. For impregnating purposes, the temperature of the aluminum powder-pitch mixture can be in the range of 275° to 375° F. This temperature will, of course, vary depending upon the properties of the particular pitch.

The step of impregnating the dry paper tubes can be performed in any manner which will force the pitch into the pores and interstices of the paper tubes. A preferred method is one wherein the paper tubes are placed in a pressure vessel and subjected to a vacuum for a number of minutes. The molten aluminum powder-pitch mixture is then pumped into the pressure vessel until the tubes are submerged. The molten mixture is circulated for a period of minutes to insure an even distribution of pitch and aluminum. The pressure in the vessel is then raised to atmospheric pressure thereby forcing the pitch into the pore spaces of the paper tubes. The remaining molten pitch-aluminum powder mixture is then drained from the vessel, and the tubes are withdrawn and quenched.

It is not completely understood as to what phenomenon occurs. There is, of course, a filtering action in which the suspended aluminum powder is retained in a film of pitch on the surfaces of the paper tubes. If pitch, other than 100% unoxidized petroleum pitch, and aluminum powder, other than leafing aluminum powder, are used, the presence of aluminum powder in the film of impregnant on the surface of the pipe is less readily apparent and may be completely masked. Usually visual examination of the pipe surface, however, shows a metallic glint in the black surface. If unoxidized petroleum pitch and leafing aluminum have been used, the aluminum particles — because of their leafing action — tend to stay on the film surface yielding a pipe with a metallic aluminized surface.

The improved properties of aluminum powder-pitch impregnated fiber pipe made by this improved process have been demonstrated. In one test, a specimen of pipe was prepared using a standard commercial impregnant comprising 15% coal tar pitch and 85% unoxidized petroleum pitch. A second specimen was prepared using unoxidized petroleum pitch corresponding to sample D from Table II mixed with powdered aluminum having the properties shown in Table III. The concentration of aluminum powder was 0.68% in the final impregnant composition. The outside diameter of the pipe was 4 7/16 inches and the wall thickness was ¼ inch. Samples of each specimen were then tested. In the copending parent application, data from tests having less relevance was included in the test results reported. Only the data from those tests deemed most relevant are included in this specification and are as follows:

|  | 15% Coal Tar Pitch 85% Petroleum Pitch (UO) | 99.32% Petroleum Pitch (UO) 0.68% Aluminum | ASTM 2311 Specification |
|---|---|---|---|
| Creep (23 hr.) [1] | .100 inches avg. | .084 inches | — |
| Water absorption [2] | 1.04% average | .75 & .60% | 2% Max. |
| Dry Crushing Strength, lb./ft. [3] | 800 average | 920 | 800 |
| Flattening [4] | .80% average | .69 & .65% | 3% Max. |

[1] Inches of creep per two-inch section of pipe under 1000 psi at 68° F, after 23 hours.
[2] Percentage weight gain of original weight after 48 hours submersion in water at 70° F and atmospheric pressure.
[3] Load at rupture point in pounds per linear foot.
[4] Percent reduction in diameter under 80 lbs./linear foot at 120° F.

From the preceding table it will be noted that all properties of the aluminized pipe were improved over those of pipe prepared with a conventional impregnating pitch.

Additional samples of fiber pipe impregnated with petroleum pitch (pitch sample D, Table II) containing various concentrations of suspended aluminum powder were prepared and tested. The pipe diameter again was 4 7/16 inches o.d. and the wall thickness ¼ inch. Results were as follows:

| Sample | Pipe Impregnant Composition | Creep [1] | Water Absorption [2] | Dry Crushing Strength [3] | Flattening [4] |
|---|---|---|---|---|---|
| A | 0% Aluminum 100% Petroleum Pitch [5] | 0.72 avg. | 1.61–1.94 | 800 | 1.81–3.87 |
| B | .17% Al. [6] | 0.70 avg. | 1.48–1.83 | 840–800 | 1.96–2.10 |
| C | .34% Al. [6] | 0.68 avg. | 1.58–1.57 [7] | 720 | 2.04–2.18 |
| D | .68% Al. [6] | 0.72 avg. | 1.17–1.26 | 760–700 | 1.06–1.37 |
| E | 1.36% Al. [6] | 0.51 avg. | 0.63–0.60 | 920–1000 | 0.96–1.31 |

[1] Inches of creep per two-inch section of pipe under 1000 psi at 68° F, after one hour.
[2] Percentage weight gain of original weight after 48 hours submersion in water at 70° F and atmospheric pressure.
[3] Load at rupture point in pounds per linear foot.
[4] Percent reduction in diameter under 80 lbs./linear foot load at 120° F.
[5] Unoxidized (thermal) petroleum pitch in all tests.
[6] Percent of aluminum in total mixture.
[7] This anomaly is attributed to experimental error.

Sections of pipe samples A, B and C were tested in a conventional weatherometer for 619 hours, (the equivalent of 18 months outdoor exposure). Results were as follows:

| Impregnant | Observation |
|---|---|
| 0% Aluminum 100% Petroleum Pitch | Surface was dull, dusty brown. |
| .17% Aluminum | Some evidence of aluminum-fiber surface still dull. |
| .34% Aluminum | Bright aluminum coating and film. No dusting evident. |

In another plant test a sample of fiber pipe was made in which the impregnant was 20 percent coal tar pitch and 80 percent unoxidized petroleum pitch, another sample in which the impregnant was 100% unoxidized petroleum pitch, and a third in which the impregnant was one percent aluminum and 99 percent unoxidized petroleum pitch having a softening point of 170° F. Samples of each of these runs when tested yielded the following results:

|  | 20% Coal Tar Pitch 80% Petroleum Pitch (UO) [1] | 100% Petroleum Pitch (UO) [1] | 1% Aluminum 99% Petroleum Pitch (UO) [1] Range | Avg. | ASTM D1861 Standard |
|---|---|---|---|---|---|
| Wet Creep [2] | .56 | .38 | .30–.46 | .375 | — |
| Water Absorption [3] | 1.13% | 1.26% | .78–1.02% | .90% | 2% Max. |
| Water Absorption (200 hours) [4] | 3.37% | 3.85% | 2.0–3.8% | 2.82% | — |
| Dry Crushing Strength, lb./ft. [5] | 1140 | 1160 | 1100–1262 | 1165 [7] | 1250 Min. |
| Flattening [6] | 1.10 | 1.47 | .78–1.62% | 1.17% | 3% Max. |

[1] UO indicates unoxidized petroleum pitch.
[2] Dry sample immersed in water and loaded at 1000 psi fiber stress for 336 hours (two weeks).
[3] Percentage weight gain of original weight after 48 hours submersion in water at 70° F and atmospheric pressure.
[4] Percentage weight gain of original weight after 200 hours submersion in water at 70° F and atmospheric pressure.
[5] Load at rupture point in pounds per linear foot.
[6] Percent reduction in diameter under 80 lbs./linear foot at 120° F.
[7] During this plant test the dry paper tubes were of reduced quality. The reduced crushing strength is thought to have resulted from the reduced paper tube quality.

In another test a sample of pipe impregnated with an impregnant comprising 20% coal tar pitch, 1% aluminum and the remainder unoxidized petroleum pitch exhibited only 0.73 percent water absorption after submersion in water for five days. The average amount of absorption of a pipe sample impregnated only with 20% coal tar pitch and 80% petroleum pitch after five days would be about 1.5 percent.

Increased ease in handling aluminized pipe sections has been noted by persons manually working with them. Aluminized pipe exposed to the summer sun does not heat to as high a temperature as conventional black pitch impregnated pipe. The aluminized pipe thus can be handled more easily with bare hands or thin gloves. Personnel have also noted that aluminized pipe sections are easier to load because the pipe lengths more readily slide over each other than do the conventional black pitch impregnated pipe lengths.

Unless specifically indicated otherwise herein all percentage compositions listed herein are compositions by weight.

I claim:

1. A composition for impregnating fibrous tubular bodies in the mamnufacture of pitch impregnated fiber pipe consisting essentially of:
   a. molten unoxidized thermal petroleum pitch, and
   b. aluminum pigment suspended in said pitch in a concentration of between about 0.1 to about 1.4 percent by weight of pitch-aluminum mixture wherein at least 85% of the aluminum particles in said pigment is in the range of 0.5 to 44 microns.

2. The composition of claim 1 wherein the aluminum particles are a leafing aluminum pigment.

3. The composition of claim 1 wherein said aluminum particles are a non-leafing aluminum pigment which functions as a leafing aluminum at the temperature of impregnation.

4. The composition of claim 1 wherein the concentration of aluminum particles in said composition is between about 0.3 percent and about 0.7 percent by weight of pitch-aluminum mixture.

* * * * *